US012325246B2

(12) United States Patent
Ishii

(10) Patent No.: US 12,325,246 B2
(45) Date of Patent: Jun. 10, 2025

(54) INKJET PRINTER, LIQUID DISCHARGE APPARATUS, AND CONTROL METHOD THEREOF

(71) Applicant: CANON KABUSHIKI KAISHA, Tokyo (JP)

(72) Inventor: Ayuko Ishii, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 113 days.

(21) Appl. No.: 18/323,681

(22) Filed: May 25, 2023

(65) Prior Publication Data

US 2023/0391099 A1 Dec. 7, 2023

(30) Foreign Application Priority Data

Jun. 6, 2022 (JP) ................................ 2022-091826

(51) Int. Cl.
*B41J 2/175* (2006.01)

(52) U.S. Cl.
CPC ................................ *B41J 2/17566* (2013.01)

(58) Field of Classification Search
CPC .... B41J 2/175; B41J 2/17506; B41J 2/17509; B41J 2/1752; B41J 2/17546
See application file for complete search history.

(56) References Cited

U.S. PATENT DOCUMENTS

| | | | | |
|---|---|---|---|---|
| 6,145,950 A * | 11/2000 | Ohtsuka | ............... | B41J 2/17546 347/15 |
| 2003/0072022 A1* | 4/2003 | Someno | ............... | B41J 2/17546 358/530 |
| 2017/0274668 A1* | 9/2017 | Kawashima | ......... | B41J 2/17596 |

FOREIGN PATENT DOCUMENTS

| | | |
|---|---|---|
| JP | 2003-211699 A | 7/2003 |

* cited by examiner

*Primary Examiner* — Anh T Vo
(74) *Attorney, Agent, or Firm* — Venable LLP

(57) ABSTRACT

An inkjet printer includes a printer head, two ink tanks containing inks of the same color, a storage unit and a control unit. Each ink tank is configured to be attachable/detachable to/from a printer main body, and the control unit causes the storage unit to store identification information of each ink tank as first information, selects one ink tank and sets it as an active tank that supplies ink to the printer head, causes the storage unit to store identification information of the detached ink tank as second information based on the first information, and sets the reattached ink tank as the active tank based on the second information.

10 Claims, 5 Drawing Sheets

INKJET PRINTER, LIQUID DISCHARGE APPARATUS, AND CONTROL METHOD THEREOF

BACKGROUND OF THE INVENTION

Field of the Invention

The present invention mainly relates to an inkjet printer.

Description of the Related Art

Some inkjet printers are attached with a plurality of ink tanks containing inks of the same color. According to this configuration, even if the ink tank (active tank) currently supplying ink to the printer head becomes empty, the printer can execute printing over a relatively long time without exchanging the ink tank. This can prevent generation of downtime of the printer.

In general, since the quality of ink in the ink tank may change over time due to, for example, evaporation or the like, it can be required to prevent unnecessary change or switching of the active tank. On the other hand, in the above-described printer, a user may temporarily detach the ink tank from the printer main body to, for example, check the residual amount of ink of the ink tank, and the active tank may be changed unintentionally. This can cause a deterioration in quality of a printed product.

SUMMARY OF THE INVENTION

The present invention has been made in recognition of the above problem by the present inventor, and provides a technique advantageous in improving the quality of printed products generated over a relatively long time.

One of the aspects of the present invention provides an inkjet printer that comprises a printer head, not less than two ink tanks containing inks of the same color, a storage unit, and a control unit, wherein each of the not less than two ink tanks is configured to be attachable/detachable to/from a printer main body, and the control unit includes a first storage unit configured to cause the storage unit to store identification information of each of the not less than two ink tanks as first information, a first setting unit configured to select one of the not less than two ink tanks, and set the selected ink tank as an active tank that supplies ink to the printer head, a second storage unit configured to, if the ink tank set as the active tank is detached from the printer main body, cause the storage unit to store, as second information, identification information of the detached ink tank based on the first information, and a second setting unit configured to, if the detached ink tank is reattached to the printer main body, set the reattached ink tank as the active tank based on the second information.

Further features of the present invention will become apparent from the following description of exemplary embodiments (with reference to the attached drawings).

DESCRIPTION OF THE EMBODIMENTS

Figure 1:
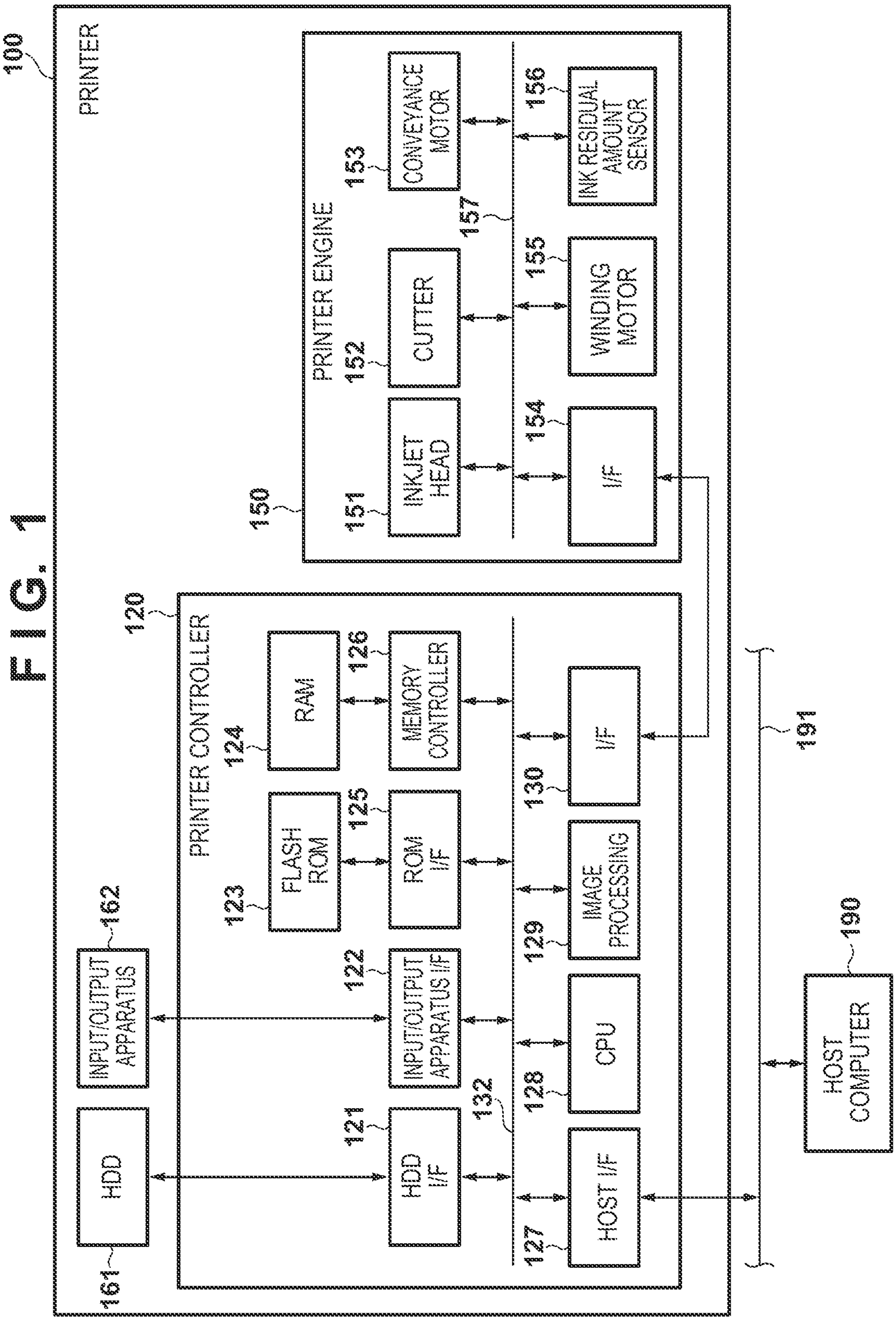
FIG. 1 is a block diagram showing an arrangement example of an inkjet printer.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIG. 1 is a block diagram showing an arrangement example of an inkjet printer 100 according to an embodiment. The printer 100 includes a printer controller 120, a printer engine 150, a Hard Disk Drive (HDD) 161, and an input/output apparatus 162. The printer 100 can connect to a host computer 190 via a network 191.

The printer controller 120 includes an HDD interface (HDD UF) 121, an input/output apparatus interface (input/output apparatus UF) 122, a ROM interface (ROM UF) 125, and a memory controller 126. The printer controller 120 further includes a host interface (host UF) 127, a Central Processing Unit (CPU) 128, an image processing unit 129, and a controller engine interface 130. These elements are connected to each other via a system bus 132. The printer controller 120 further includes a Flash ROM 123 and a RAM 124. The Flash ROM 123 and the RAM 124 are connected to the system bus 132 via the ROM OF 125 and the memory controller 126, respectively.

The CPU 128 controls the overall operation of the printer 100 by executing a program or activating hardware. The Flash ROM 123 stores a program to be executed by the CPU 128, fixed data necessary for the operation of the printer 100, and the like. The RAM 124 is used as the work area of the CPU 128. The RAM 124 can temporarily hold data received from outside, and store setting data necessary for printing. The CPU 128 (accessorily the Flash ROM 123 and the RAM 124) functions as a control unit 300 (see FIG. 3). Details will be described later.

The image processing unit 129 can execute known image processing. For example, the image processing unit 129 performs processing of converting or deploying print data (typically, data described in a page description language) input to the printer 100 into image data (bitmap image data). More specifically, the image processing unit 129 converts the color space (for example, YCbCr) in the print data into a standard RGB color space (for example, sRGB). The image processing unit 129 can also convert the resolution of the image data into the number of pixels so that the printer 100 can perform a printing process, and can also perform various kinds of image processing such as image analysis and image correction. The image data obtained as described above can be held or stored in the RAM 124 or the HDD 161.

The printer engine 150 includes an inkjet head 151, a cutter 152, a conveyance motor 153, an interface 154, a winding motor 155, and an ink residual amount sensor 156. These elements are connected to each other via a system bus 157.

The inkjet head 151 is a printing execution unit or simply a printing unit that can execute printing of an image based on the image data on an arbitrary print medium. The inkjet head 151 includes a plurality of head units, and can use them to discharge ink droplets of a plurality of colors onto a print medium being conveyed.

The cutter 152 is a cutting mechanism that cuts a long print medium (for example, a roll sheet) into a print medium (for example, a cut sheet) of a predetermined length. The conveyance motor 153 is controlled by the CPU 128, and drives conveyance rollers nipping a print medium to convey the print medium in a predetermined direction. The winding motor 155 is controlled by the CPU 128, and rotates the shaft of a winding mechanism that winds up a roll sheet. One or more ink residual amount sensors 156 are arranged on an ink tank corresponding to the supply source of ink serving as a print agent, and detect the ink residual amount in the ink tank.

As the input/output apparatus 162, a known apparatus that can accept an operation input from a user and perform necessary display is used. A typical example is a touch panel display. Alternatively, the input/output apparatus 162 may be provided separately as an input apparatus such as physical keys and an output apparatus such as a liquid crystal display. Alternatively/additionally, the input/output apparatus 162 may be connected to the outside of the printer 100 via wired or wireless communication. For example, the input/output apparatus 162 may be provided in the host computer 190. A sound source such as a buzzer or a lighting body such as an LED may be additionally used.

The HDD 161 stores a program, data, or information necessary for the printer 100 to execute printing. In place of the HDD 161, another mass storage apparatus such as a Solid State Drive (SDD) may be used.

The printer 100 receives print data from the host computer (external apparatus) 190 via the network 191. In place of the host computer 190, the printer 100 may receive print data from another device such as, for example, a scanner, a digital camera, or a smartphone that has an image reading function as a main function or a sub-function.

Figure 2:
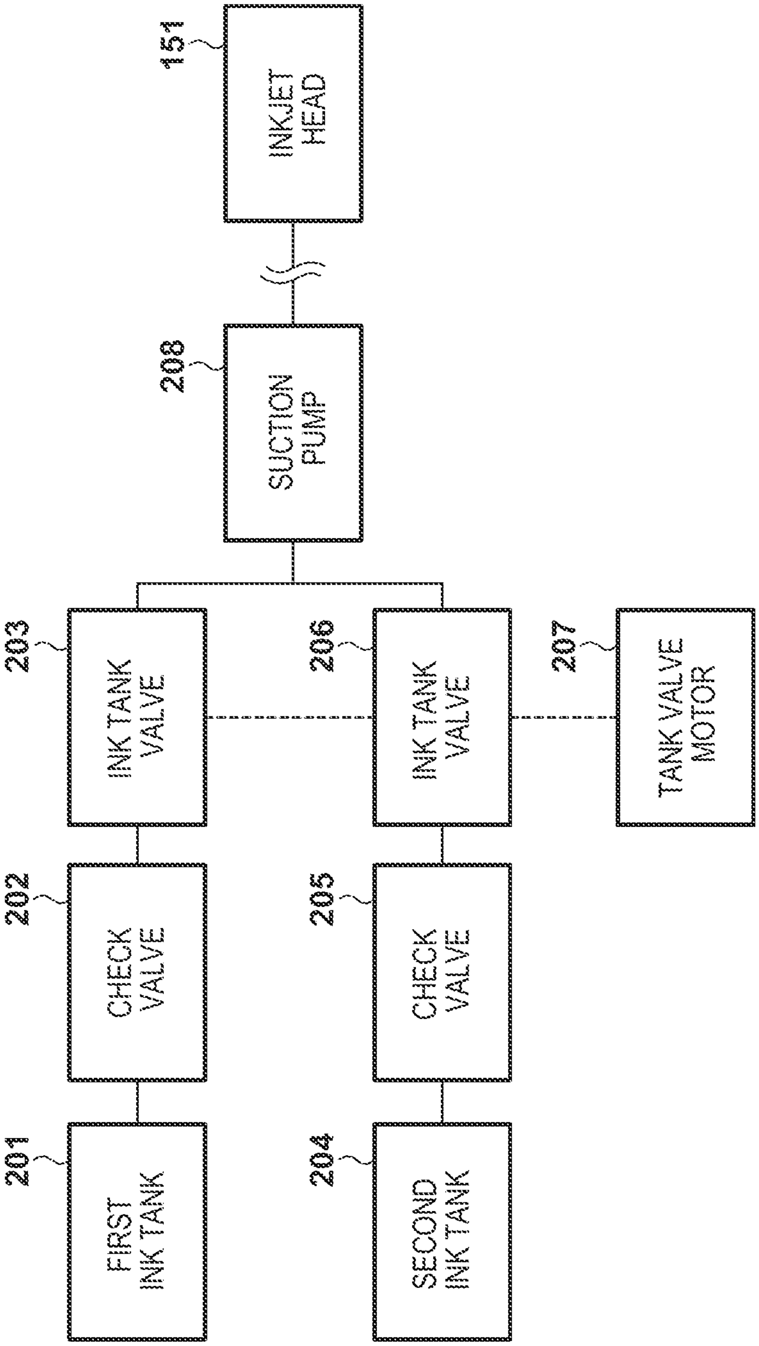
FIG. 2 is a block diagram showing an arrangement example of the ink flow path in the printer.

FIG. 2 is a block diagram showing an arrangement example of the ink flow path in the printer 100. A thick straight line connecting elements in FIG. 2 represents the ink flow path, and a dotted line represents an electrical connection. The printer 100 includes ink tanks 201 and 204, check valves 202 and 205, ink tank valves 203 and 206, a tank valve motor 207, and a suction pump 208.

The ink tanks 201 and 204 are configured to be attachable/detachable to/from the main body of the printer 100. The ink tanks 201 and 204 can contain inks of the same color, and selectively supply the ink to the inkjet head 151. Details will be described later.

The check valves 202 and 205 are provided with respect to the ink tanks 201 and 204, respectively, and prevent the ink in the flow path from entering the ink tanks 201 and 204 attached to the main body of the printer 100.

The tank valve motor 207 controls the open/closed state of each of the ink tank valves 203 and 206 so as to allow ink supply from one of the ink tanks 201 and 204 to the inkjet head 151. For example, each of the ink tank valves 203 and 206 are configured such that the open/closed state thereof is controlled by a cam that can be rotated by driving of the tank valve motor 207. When one of the ink tank valves is in the open state, the other one is set in the closed state.

The suction pump 208 is a pump that sucks ink from one of the ink tank valves 203 and 206 which is in the open state. With this, the ink is supplied to the inkjet head 151 via a predetermined flow path.

Figure 3:
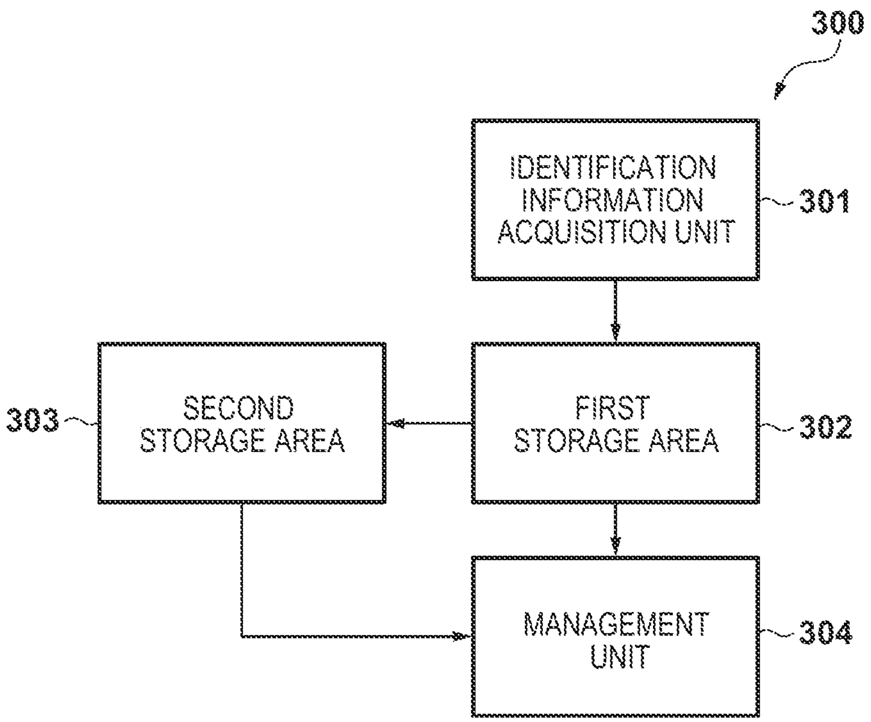
FIG. 3 is a block diagram showing an arrangement example of a control unit.

FIG. 3 is a block diagram showing the arrangement of the control unit 300. The control unit 300 includes an identification information acquisition unit 301, a first storage area 302, a second storage area 303, and a management unit 304.

If an arbitrary ink tank for the printer 100 is attached, the identification information acquisition unit 301 acquires identification information (individual identification information such as a serial code or a manufacturing number) of the ink tank from the ink tank. The identification information can be typically acquired by electrical communication. The identification information acquisition unit 301 may be expressed as the identification information reading unit 301, or simply the acquisition unit 301, the reading unit, or the like.

Here, the storage areas 302 and 303 are given memory blocks in the Flash ROM 123. As another embodiment, the element that provides the storage areas 302 and 303 may be another nonvolatile memory, a volatile memory, or a given element that functions as a storage unit. The storage area 302 holds or temporarily stores the identification information of each ink tank currently attached to the main body of the printer 100. The storage area 303 holds or temporarily stores the identification information of the ink tank detached from the main body of the printer 100.

It is only required that the areas 302 and 303 are different areas at an arbitrary timing in the Flash ROM 123. That is, in the Flash memory 123, a memory block that functions as the area 302 at a given timing may function as the area 303 at another timing.

The management unit 304 manages the information of the ink tank, among a plurality of ink tanks (two ink tanks 201 and 204 in this embodiment), currently supplying ink to the inkjet head 151. This ink tank is expressed as the "active tank" hereinafter. The management unit 304 may be expressed as an ink supply source management unit or the like.

The information of the active tank includes information associating the identification information of the active tank and the information of the attachment portion or slot to which the active tank is attached in the printer 100. The identification information acquired by the identification information acquisition unit 301 can be processed based on the functions of respective elements as indicated by arrows in FIG. 3.

Figure 4:
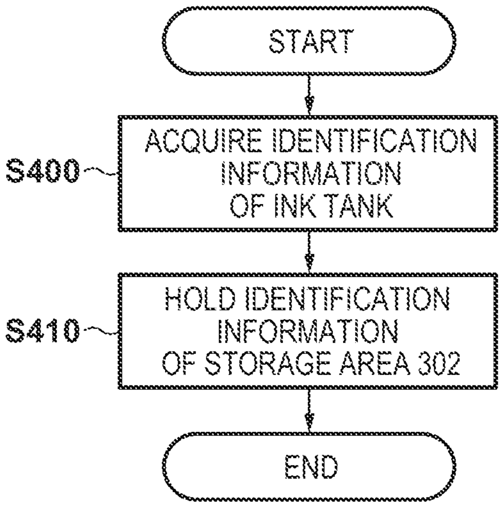
FIG. 4 is a flowchart showing an example of the processing mode of identification information upon attachment of an ink tank.

FIG. 4 is a flowchart showing an example of the processing mode of identification information upon attachment of an ink tank to the main body of the printer 100. If an ink tank for the printer 100 is attached, in step S400 (to be simply referred to as "S400" hereinafter, and this also applies to other steps to be described later), the CPU 128 acquires the identification information of the attached ink tank from the identification information acquisition unit 301. The acquired identification information is held in the storage area 302 in S410. This processing is performed for all ink tanks attached to the main body of the printer 100.

Figure 5:
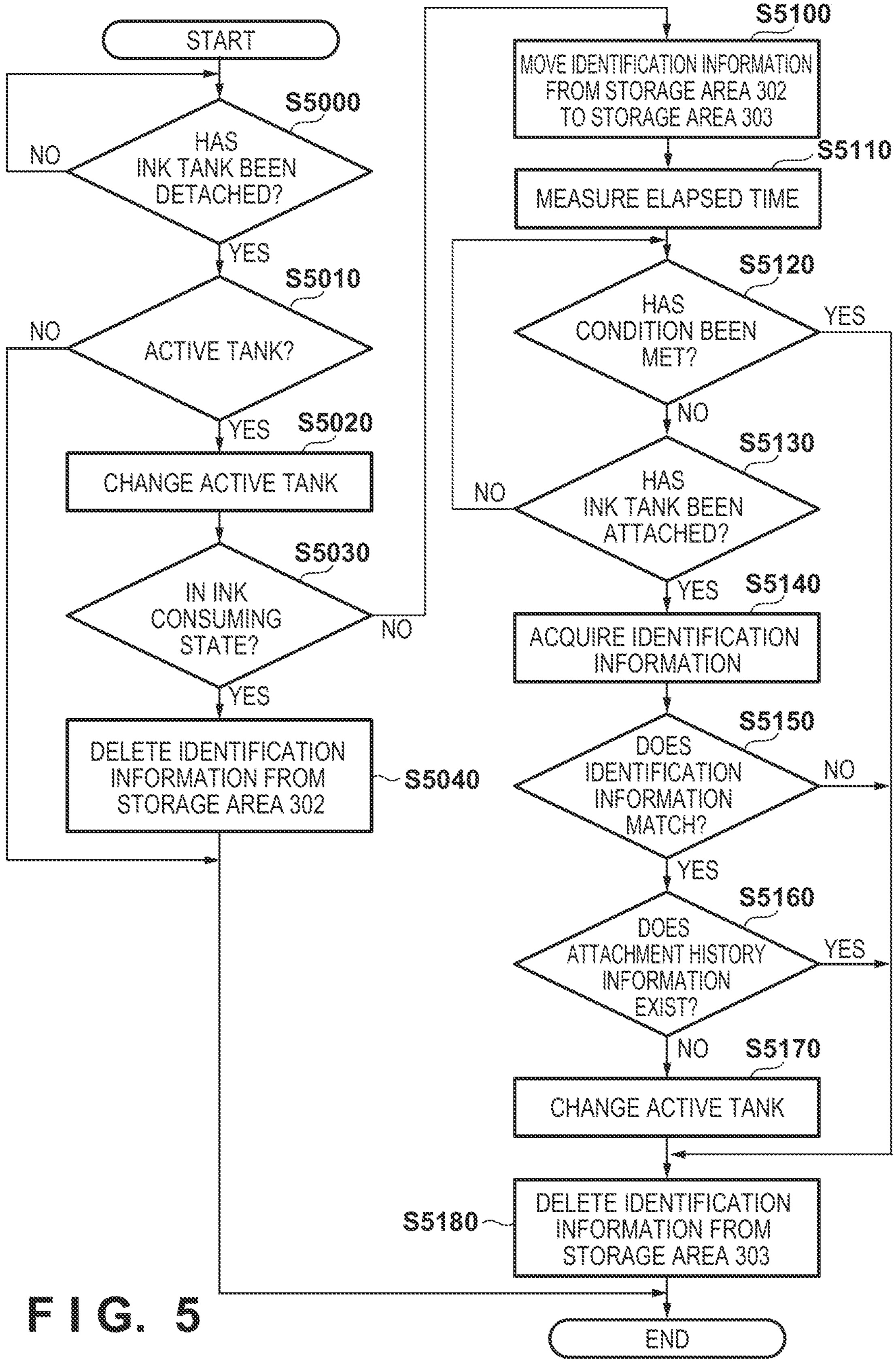
FIG. 5 is a flowchart showing an example of the processing mode of identification information upon detachment of an ink tank.

FIG. 5 is a flowchart illustrating the processing upon detachment of an ink tank from the main body of the printer 100. In this embodiment, assume that the two ink tanks 201 and 204 containing inks of the same color are attached (see FIG. 2), and the ink tank 201 is selected and set as the active ink tank.

Here, two ink tanks are used, but three or more ink tanks may be used. That is, it is only required that multiple (two or more) ink tanks can be attached to the printer 100. Further, it is assumed that the ink tanks 201 and 204 contain, for example, black inks, but if the printer 100 is a color compatible printer (the printer 100 can discharge inks of multiple colors), multiple (two or more) ink tanks of other colors can also be attached to the main body of the printer 100.

In S5000, it is determined whether the ink tank 201 or 204 is detached. If the ink tank 201 or 204 is detached, the process advances to S5010; otherwise, the process returns to S5000.

In S5010, it is determined whether the ink tank 201 or 204, that has been determined to be detached in S5000, is the active tank. If the active tank (the ink tank 201 in this embodiment) has been detached, the process advances to S5020; otherwise, the process advances to S5040.

In S5020, the active tank is changed or updated to the ink tank that remains attached to the main body of the printer 100 (that is, the remaining ink tank 204).

In S5030, it is determined whether the printer 100 is in an ink consuming state at this timing. If the printer 100 is in the ink consuming state, the process advances to S5040; otherwise, the process advances to S5100. Here, the ink consuming state indicates a state in which ink is currently consumed in the printer 100. For example, in a maintenance operation, in order to make the inkjet head 151 capable of discharging ink properly, ink of a predetermined amount is generally supplied to and consumed by the inkjet head 151. Therefore, the ink consuming state here includes, in addition to a state in which printing is currently executed, a state in which a maintenance operation is being executed. An example of the maintenance operation is processing for recovering the function or performance of the inkjet head 151, such as cleaning processing.

In S5040, the identification information of the ink tank, that has been determined to be detached in S5000, is deleted from the storage area 302.

In S5100, the identification information of the active tank determined to be detached in S5000 and S5010 is held in the storage area 303 and deleted from the storage area 302. In other words, the identification information of the active tank is moved from the storage area 302 to the storage area 303.

In S5110, the elapsed time from the detachment of the active tank is started to be measured. This measurement may be performed using a counter that can be incorporated in the printer 100.

In S5120, it is determined whether a predetermined condition is met. Here, it is determined whether the measured time satisfies a criterion and/or the printer 100 has been set in the ink consuming state. If the condition is met, the process advances to S5180; otherwise, the process advances to S5130.

In S5130, it is determined whether an ink tank is attached to the main body of the printer 100. If an ink tank is attached, the process advances to S5140; otherwise, the process returns to S5120.

In S5140, the identification information of the ink tank determined to be attached in S5130 is acquired (see FIG. 4).

In S5150, it is determined whether the identification information acquired in S5140 matches the identification information held in the storage area 303 in S5100. If these pieces of identification information match each other, the process advances to S5160; otherwise, the process advances to S5180.

In S5160, for the ink tank determined to be attached in S5130, it is determined whether information indicating that this ink tank has been attached to another printer before being attached to the main body of the printer 100 (to be referred to as "attachment history information) exists. If the attachment history information exists, the process advances to S5180; otherwise, the process advances to S5170. The details of the attachment history information will be described later.

In S5170, the active tank changed or updated in S5020 is changed or updated to the ink tank determined to be attached in S5130. That is, the ink tank determined to be detached in S5000 is regarded as being temporarily detached from the main body of the printer 100. Therefore, after being attached to the main body of the printer 100 in S5130, this ink tank is set as the active tank again.

In S5180, the identification information held in the storage area 303 in S5100 is deleted from the storage area 303.

Figure 6:
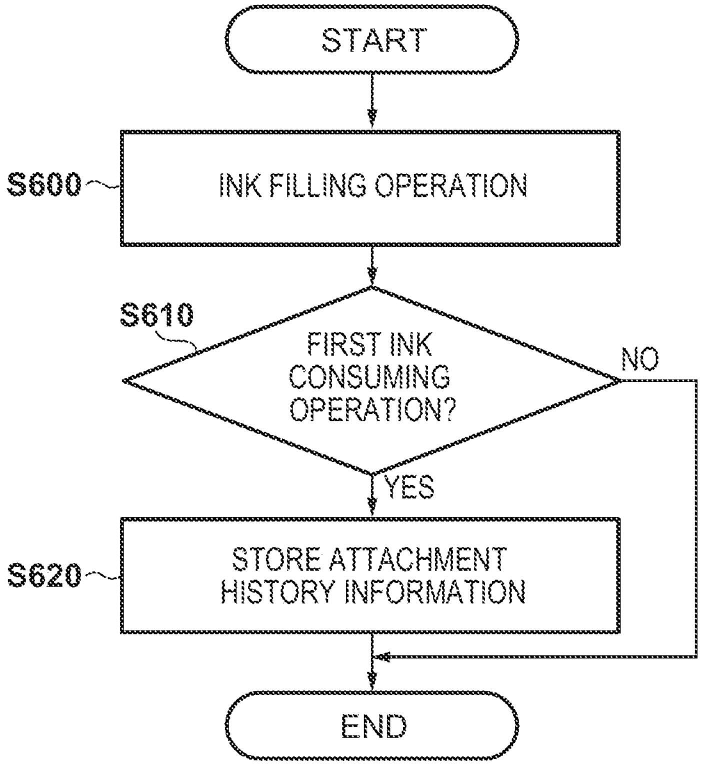
FIG. 6 is a flowchart showing an example of the processing mode of writing identification information in an ink tank.

FIG. 6 is a flowchart illustrating processing for, if an ink tank is attached to the main body of an arbitrary printer, storing attachment history information in the ink tank. A memory unit for storing the attachment history information is provided in the ink tank. Assuming that the printer to which the ink tank is attached has an arrangement similar to that of the printer 100, processing contents in the printer 100 in a case in which the ink tank is attached to the main body of the printer 100 will be described below.

In S600, the CPU 128 performs an ink filling operation of supplying ink from the attached ink tank to the inkjet head 151 (or ink flow path).

In response to this operation, the CPU 128 determines in S610 whether this operation corresponds to the first ink consuming operation after the attachment of the ink tank. If this operation corresponds to the first ink consuming operation, the process advances to S620; otherwise, the flowchart is terminated.

In S620, the CPU 128 causes the memory unit of the attached ink tank to store the identification information of the main body of the printer 100 as attachment history information. Attachment history information before the attachment to the main body of the printer 100 may have further been stored in the memory unit.

According to the above-described processing mode, the identification information of the ink tank attached to the main body of the printer 100 is held in the storage area 302, and the identification information of the ink tank detached from the main body of the printer 100 is held in the storage area 303. If the detached ink tank is the active tank, another ink tank is set as the active tank. If the detached ink tank is the active tank and reattached to the main body of the printer 100, the reattached ink tank is set as the active tank again based on the information held in the storage area 303. According to the processing mode as described above, it can be prevented that the quality of a printed product changes due to temporary detachment of the ink tank serving as the active tank from the main body of the printer 100.

After the ink tank serving as the active tank is detached and another ink tank is set as the active tank, the other ink tank may be set in a use state (ink supplying state). Hence, in this case, the other ink tank continues to be used as the active ink tank. This can prevent the quality of the printed products from changing again. The above-described case can include, for example, a case in which the elapsed time from the detachment of the ink tank satisfies the criterion and/or a case in which the printer is set in the ink consuming state after the ink tank is detached. Alternatively/additionally, the above-described case can include, for example, a case in which the ink tank attached to the main body of the printer 100 has been used in another printer.

Therefore, according to this embodiment, it is possible to improve the quality of printed products generated by the printer 100 over a relatively long time.

(Program)

The present invention may be implemented by supplying a program configured to implement one or more functions of the above-described embodiments to a system or an apparatus via a network or a storage medium and making one or more processors in the computer of the system or the apparatus to execute processing by reading out and executing the program. For example, the present invention may be implemented by a circuit (for example, an ASIC) that implements one or more functions.

(Others)

In the above description, the inkjet printer 100 has been described as an example. However, the printing method is not limited to the above-described mode. Further, the printer 100 may be a single-function printer having only a printing function, or may be a multi-function printer having a plurality of functions such as a printing function, a FAX function, and a scanner function. In addition, the printer 100 may be a manufacturing apparatus for manufacturing, for example, a color filter, an electronic device, an optical device, a microstructure, or the like using a predetermined printing method.

The term "printing" in this specification should be interpreted in a broad sense. Accordingly, the mode of "printing" does not matter whether the object formed on a print medium is significant information such as characters and graphics, and also does not matter whether the object is visualized so that a human can visually perceive it.

Further, "print medium" should be interpreted in a broad sense, similar to "printing" described above. The concept of "print medium" can include, in addition to paper which is generally used, any member that can accept ink, such as cloth, a plastic film, a metal plate, glass, ceramics, a resin, wood, leather, and the like.

Furthermore, "ink" should be interpreted in a broad sense, similar to "printing" described above. Accordingly, the concept of "ink" can include, in addition to a liquid that forms an image, a figure, a pattern, or the like by being applied onto a print medium, additional liquids that can be used for processing a print medium, processing ink (for example, coagulation or insolubilization of colorants in ink applied onto a print medium), or the like.

The function of each element described in the embodiment may be provided as a sub-function, and may be expressed by another name. The concept of each element includes an equivalent. From this point of view, the printer 100 may be expressed as a printing apparatus, a liquid discharge apparatus, or simply a discharge apparatus. Alternatively, the printer 100 may be expressed as an image forming apparatus or the like. To the same effect, the inkjet head 151 may be expressed as a printer head, a liquid discharge head, or simply a discharge head. Each of the ink tanks 201 and 204 may be expressed as a liquid reservoir or simply a reservoir.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-091826, filed Jun. 6, 2022, which is hereby incorporated by reference herein in its entirety.

What is claimed is:

1. An inkjet printer that comprises a printer head, not less than two ink tanks containing inks of the same color, a storage unit, and a control unit, wherein each of the not less than two ink tanks is configured to be attachable/detachable to/from a printer main body, and the control unit includes:

a first storage unit configured to cause the storage unit to store identification information of each of the not less than two ink tanks as first information, a first setting unit configured to select one of the not less than two ink tanks, and set the selected ink tank as an active tank that supplies ink to the printer head, a second storage unit configured to, if the ink tank set as the active tank is detached from the printer main body, cause the storage unit to store, as second information, identification information of the detached ink tank based on the first information, and a second setting unit configured to, if the detached ink tank is reattached to the printer main body, set the reattached ink tank as the active tank based on the second information.

2. The printer according to claim 1, wherein the control unit further includes:

a measurement unit configured to, if the ink tank set as the active tank is detached from the printer main body, measure an elapsed time from the detachment of the ink tank, and a deletion unit configured to, if the measured elapsed time satisfies a criterion, delete the second information from the storage unit.

3. The printer according to claim 1, wherein the control unit further includes an acquisition unit configured to, if an ink tank is attached to the printer main body, acquire identification information of the ink tank from the ink tank.

4. The printer according to claim 3, wherein the control unit further includes a deletion unit configured to, if the ink tank set as the active tank is detached from the printer main body and then another ink tank is attached to the printer main body, delete the second information from the storage unit based on identification information of the other ink tank.

5. The printer according to claim 1, wherein the control unit further includes:

a third setting unit configured to, if the ink tank set as the active tank is detached from the printer main body and then a maintenance operation of the printer head is started, select another one of the not less than two ink tanks and set the selected ink tank as the active tank, and a deletion unit configured to, at a start of the maintenance operation, delete the second information from the storage unit.

6. The printer according to claim 1, wherein the control unit further includes:

a third storage unit configured to cause an ink tank attached to the printer main body to store identification information of the printer main body, and a deletion unit configured to, if identification information stored in the ink tank attached to the printer main body does not match the identification information of the printer main body, delete the second information from the storage unit.

7. The printer according to claim 1, further comprising a pump provided in a flow path between the not less than two ink tanks and the printer head.

8. A liquid discharge apparatus that comprises a liquid discharge head, not less than two liquid reservoirs containing liquids of the same color, a storage unit, and a control unit, wherein each of the not less than two liquid reservoirs is configured to be attachable/detachable to/from a main body of the liquid discharge apparatus, and the control unit includes:

a first storage unit configured to cause the storage unit to store identification information of each of the not less than two liquid reservoirs as first information, a first setting unit configured to select one of the not less than two liquid reservoirs, and set the selected liquid reservoir as a liquid reservoir that supplies the liquid to the liquid discharge head, a second storage unit configured to, if the set liquid reservoir is detached from the main body of the liquid discharge apparatus, cause the storage unit to store, as second information, identification information of the detached liquid reservoir based on the first information, and a second setting unit configured to, if the detached liquid reservoir is reattached to the main body of the liquid discharge apparatus, set, based on the second information, the reattached liquid reservoir as the liquid reservoir that supplies the liquid to the liquid discharge head.

9. A control method of a liquid discharge apparatus that comprises a liquid discharge head, not less than two liquid reservoirs containing liquids of the same color, and a storage unit, wherein each of the not less than two liquid reservoirs is configured to be attachable/detachable to/from a main body of the liquid discharge apparatus, and the method comprises:

causing the storage unit to store identification information of each of the not less than two liquid reservoirs as first information, selecting one of the not less than two liquid reservoirs, and setting the selected liquid reservoir as a liquid reservoir that supplies the liquid to the liquid discharge head, storing, if the set liquid reservoir is detached from the main body of the liquid discharge apparatus, the identification information of the detached liquid reservoir as second information based on the first information in the storage unit, and setting, if the detached liquid reservoir is reattached to the main body of the liquid discharge apparatus, based on the second information, the reattached liquid reservoir as the liquid reservoir that supplies the liquid to the liquid discharge head.

10. A computer-readable storage medium storing a program, the program configured to cause a computer to function as each step of the method according to claim 9.

* * * * *